United States Patent [19]
Ichihara

[11] Patent Number: 5,311,427
[45] Date of Patent: May 10, 1994

[54] METHOD FOR REMOVING ARTIFACT AND FOR CORRECTING SENSITIVITY OF SINGLE PHOTON EMISSION COMPUTERIZED TOMOGRAPHY AND APPARATUS THEREOF

[75] Inventor: Takashi Ichihara, Ootawara, Japan
[73] Assignee: Kabushiki Kaisha Toshiba, Kawasaki, Japan
[21] Appl. No.: 637,268
[22] Filed: Jan. 3, 1991
[30] Foreign Application Priority Data
  Jan. 31, 1990 [JP] Japan ................................. 2-20793
[51] Int. Cl.$^5$ ...................... G01T 1/164; G06F 15/42
[52] U.S. Cl. ......................... 364/413.23; 364/413.24; 250/363.07; 250/363.09; 250/369
[58] Field of Search ....................... 364/413.13, 413.14, 364/413.16, 413.19, 413.22, 413.24; 378/4, 62, 14; 250/363.07, 363.09, 369

[56] References Cited
U.S. PATENT DOCUMENTS

| 4,817,038 | 3/1989 | Knoll et al. | 364/413.24 |
|---|---|---|---|
| 4,866,615 | 9/1989 | Ichihara | 364/413.24 |
| 4,904,870 | 2/1990 | Ichihara | 250/363.07 |
| 4,984,159 | 1/1991 | Gullberg | 364/413.16 |
| 5,032,728 | 7/1991 | Chang et al. | 250/363.04 |
| 5,048,102 | 9/1991 | Tararine et al. | 382/41 |
| 5,173,608 | 12/1992 | Motomura et al. | 250/363.09 |

OTHER PUBLICATIONS

"Headtome: A Hybrid Emission Tomograph for Single Photon and Positron Emission Imaging of the Brain", J Comput Assist Tomogr., vol. 5, No. 2, 1981, Iwao Kanno, et al., pp. 216–226.
"Triangular Spect System for 3-D Total Organ Volume Imaging: Design Concept and Preliminary Imaging Results", IEEE Transactions on Nuclear Science, vol. NS-21, No. 1, Feb., 1985, C. B. Lim et al., pp. 741–747.
IEEE Transactions on Nuclear Science, vol. NS-32, No. 1. Feb. 1985, pp. 794–798, New York, US; K. S. Han; "Some methods for SPECT uniformity correction and their evaluation".
IEEE Transactions on Nuclear Science, vol. NS-32, No. 1, Feb. 1985, pp. 741–747, New York, US; C. B. Lim et al; "Triangular SPECT system for 3-D total organ volume imaging: design concept and preliminary imaging results".

Primary Examiner—Roy N. Envall, Jr.
Assistant Examiner—A. Bodendorf
Attorney, Agent, or Firm—Oblon, Spivak, McClelland, Maier & Neustadt

[57] ABSTRACT

A single photon emission computerized tomographic (SPECT) image acquiring method in which a fan-beam collimator radiation emitted from a radio isotope (RI) supplied into a biological body under medical examination is received with employment of a gamma camera, including the steps of: acquiring first projection image data by receiving via the fan-beam collimator radiation emitted from a reference isotope source; processing the first projection image data to obtain first correction data; acquiring second projection image data by receiving via the fan-beam collimator the radiation emitted from the radio isotope injected into the biological body; correcting the second projection image data with the first correction data so as to obtain third projection image data from which an artifact component has been eliminated; and, reconstructing a SPECT image of the biological body free from the artifact component based upon the third projection image data.

22 Claims, 17 Drawing Sheets

FIG.14

S-10: ACQUIRE IMAGE DATA OF VESSEL 9 UNDER DISTANCE "b" FROM COLLIMATOR'S SURFACE

S-12: CALCULATE $B(x, y_0)$ BASED ON DISTANCE "b"

$$B(x, y_0) = h \cdot \int_{\ell}^{\ell'} \frac{f}{f-b(\ell)} \cdot Ci(\ell) \, d\ell$$

S-14: CALCULATE
$$U(x, y_0) = A(x, y_0) / B(x, y_0)$$

S-16: PRODUCE UNIFORMITY CORRECTION DATA $= 1 / U(x, y_0)$

S-18: STORE CALCULATED CORRECTION DATA INTO CORRECTION TABLE MEMORY $A_R$: RADIUS OF EFFECTIVE FIELD

METHOD FOR REMOVING ARTIFACT AND FOR CORRECTING SENSITIVITY OF SINGLE PHOTON EMISSION COMPUTERIZED TOMOGRAPHY AND APPARATUS THEREOF

BACKGROUND OF THE INVENTION

1. Field of the Invention

The present invention relates to a method and a single photon emission computerized tomographic (SPECT) apparatus for reconstructing a SPECT image by receiving radiation emitted from a radio isotope injected into a biological body under medical examination. More specifically, the present invention is directed to a method and a SPECT apparatus capable of removing a ring-shaped artifact and of correcting sensitivity with employment of a fan-beam collimator and a gamma camera.

2. Description of the Related Art

In general, a fan-beam collimator employed a single photon emission computerized tomographic apparatus (referred to as a "SPECT" apparatus hereinafter) has both spatial resolution and a sensitivity characteristic as represented in FIG. 1 and defined as follows. That is, the spatial resolution and sensitivity characteristic of such a fan-beam collimator are determined based upon a function between a distance "b" measured from a surface of this collimator and an angle "θ" with respect to a focal point of the fan beam. As a result, a sensitivity profile curve of the fan-beam collimator is represented in FIG. 2 in which a counted value becomes high at a center portion of the reconstructed SPECT image, and the counted values become rapidly low depending upon distances apart from the center portion along an X-direction. Also, if the fan-beam collimator owns low focusing precision, uneven or unbalanced sensitivity occurs. Further if machining precision of the collimator is lowered, a ring-shaped artifact may happen to occur in a SPECT image. Both of the uneven sensitivity and ring-shaped artifact are superimposed on the sensitivity profile curve.

Under such circumstances, in the conventional SPECT apparatus, as the reconstruction algorithm, one method for correcting only the spatial resolution has been proposed as an image reconstruction algorithm based upon a weight back-projection method for back-projecting a weight coefficient as represent in FIG. 3. Furthermore, another conventional SPECT system has been proposed in, for instance, IEEE Transaction on Nuclear Science, "TRIANGULAR SPECT SYSTEM FOR 3-D TOTAL ORGAN VOLUME IMAGING DESIGN CONCEPT AND PRELIMINARY IMAGING RESULTS" written by C. B. Lim et al., vol NS-32, No. 1, February 1985. In this SPECT system, the radio isotope is stored with a phantom having a diameter equal to an effective field and then a SPECT image is once acquired. Based upon the SPECT image containing the ring-shaped artifact component, the uneven sensitivity, and the uneven SPECT value caused by the scattering and absorption of the gamma ray, a memory table is produced by the reverse SPECT values as correction data, and the subsequent SPECT image data are corrected based on these correction data read out from the memory table.

However, there are the following problems in these conventional correcting methods for the SPECT imaging apparatuses. That is, while the sensitivity component caused by the fan-shaped collimator is not separated from the component of the ring-shaped artifact, both the sensitivity correcting and ring-shaped artifact removing operations are simultaneously carried out for the reconstructed SPECT image data. As a consequence, both the sensitivity correction for the SPECT system (especially fan-beam collimator) and ring-shaped artifact elimination may not be precisely executed because the resultant SPECT image data still contains unevenness caused by the scattering phenomenon of the gamma ray.

SUMMARY OF THE INVENTION

The present invention has been made in an attempt to solve the above-described problems, and therefore has an object to provide a novel single photon emission computerized tomographic apparatus and a novel method capable of separately eliminating a ring-shaped artifact caused by a fan-beam collimator and of correcting an uneven sensitivity mainly caused by this collimator.

To achieve such an object, a method for acquiring single photon emission computerized tomographic (SPECT) image data by receiving via a fan-beam collimator (7), radiation emitted from a radio isotope (RI) injected into a biological body under medical examination with employment of a gamma camera (8), comprises the steps of:

acquiring first projection image data by receiving via the fan-beam collimator (7), radiation emitted from reference RI source means (9);

processing said first projection image data to obtain first correction data;

acquiring second projection image data by receiving via said fan-beam collimator (7) said radiation emitted from said radio isotope injected into the biological body;

correcting said second projection image data with said first correction data so as to obtain third projection image data from which an artifact component has been eliminated; and, reconstructing a SPECT image of the biological body under medical examination based upon said third projection image data with free from the artifact component.

Furthermore, a single photon emission computerized tomographic (SPECT) image apparatus (1000) comprises:

data acquiring means (2) for acquiring both first projection image data by receiving via a fan-beam collimator (7), first radiation emitted from reference radio isotope (RI) source means (9), and also second projection image data by receiving via the fan-beam collimator (7), second radiation emitted from a radio isotope injected into a biological body under medical examination, with employment of a gamma camera (8);

artifact removing means (5) for processing said first projection image data to obtain first correction data, and for correcting said second projection image data based upon said first correction data to obtain third projection image data from which an artifact component has been removed; and, reconstructing means (3) for reconstructing a SPECT image of the biological body under medical examination based on said third projection image data with free from the artifact component.

BRIEF DESCRIPTION OF THE DRAWINGS

FIG. 14 is a flowchart for explaining in detail a production of the artifact elimination data;

DETAILED DESCRIPTION OF THE PREFERRED EMBODIMENTS

Basic Idea of Artifact Elimination and Sensitivity Correction

The present invention has been accomplished based upon the following two basic ideas, i.e., a sensitivity correction mainly for the fan-beam collimator and also an artifact-component elimination for the collimator. These basic ideas will now be successively explained.

(A) Sensitivity Correction of Fan-Beam Collimator

A "sensitivity correction" implies in this specification that an uneven sensitivity distribution within an effective field of a SPECT image is corrected to finally obtain an even, or uniform sensitivity distribution.

Figure 5:
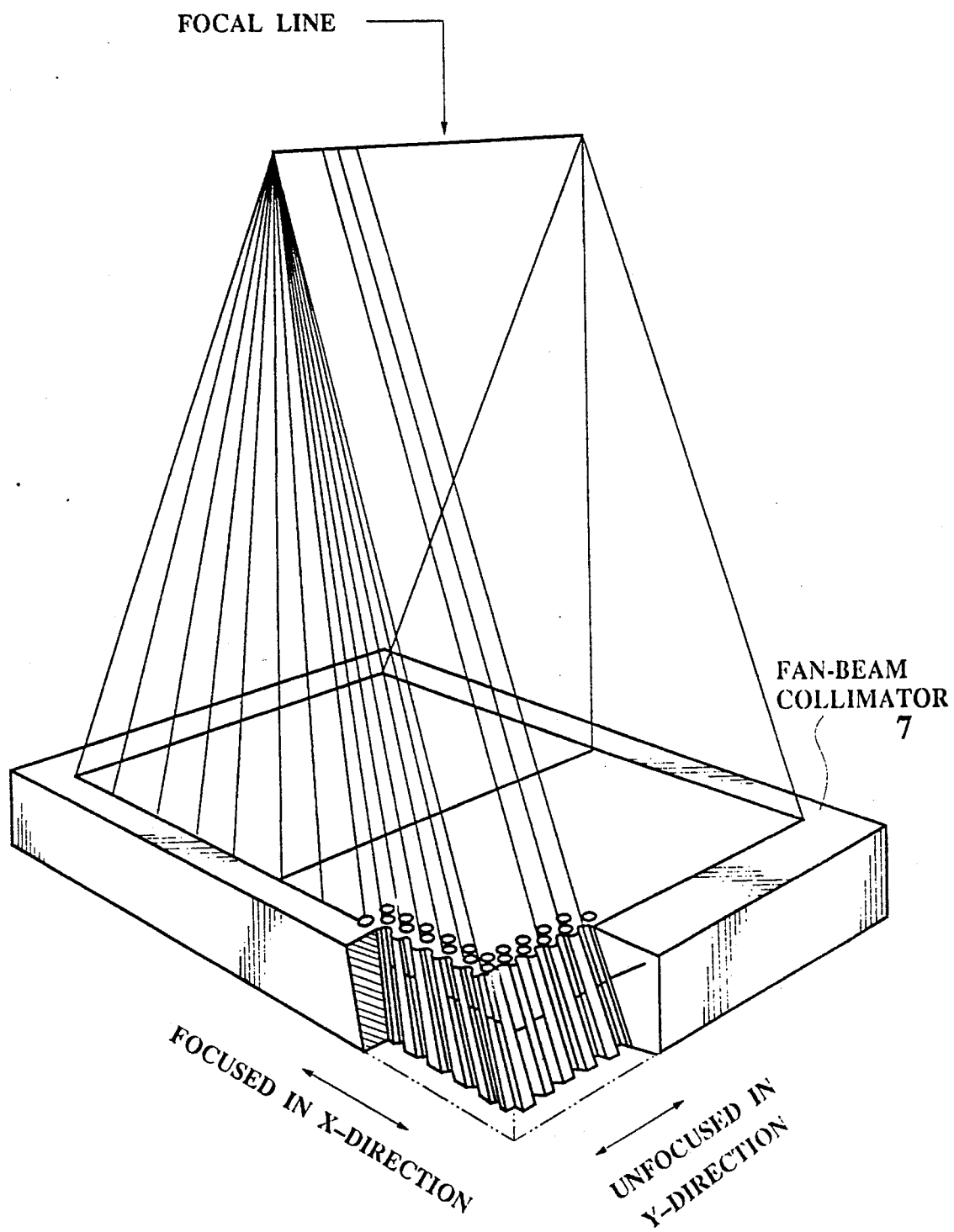
FIG. 5 is an illustration of a fan-beam collimator employed in the SPECT apparatus shown in FIG. 4.
Figure 6:
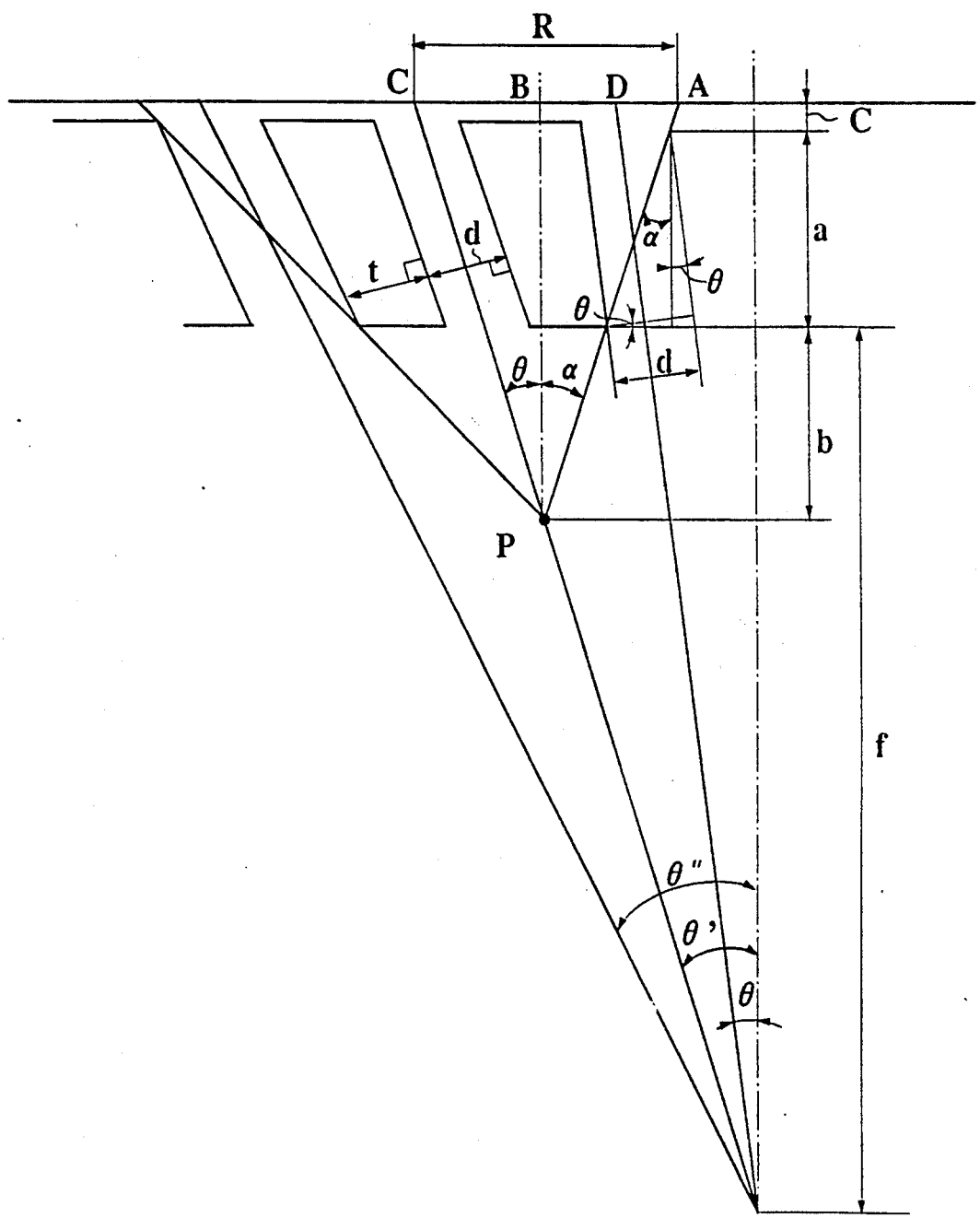
FIG. 6 represents a detailed major portion of the collimator shown in FIG. 5.

In FIG. 5, there is shown an overall construction of a typical fan-beam collimator 7. Then, a detailed structure of the major portion of this collimator 7 is represented in FIG. 6. Under various conditions shown in FIGS. 5 and 6, a sensitivity "$\Omega$" of the fan-beam collimator 7 is expressed by the following formula (1).

$$\Omega = \left[ \frac{kd^2}{a_\Theta (d + t)} \right]^2 \cos^2 \Theta \cdot \frac{f}{f - b} \quad (1)$$

where symbol "b" indicates a distance from the collimator's surface and a point "P"; symbol "t" denotes a wall thickness; symbol "f" indicates a focal length; symbol "d" is a hole diameter; symbol "$a_\Theta$" is equal to a $-2\mu$; symbol "$\mu$" represents an absorption coefficient of a gamma ray; and also symbol "$\kappa$" indicates a constant determined by a hole shape of the collimator, e.g., 0.625 for a hexagon.

Figure 7:
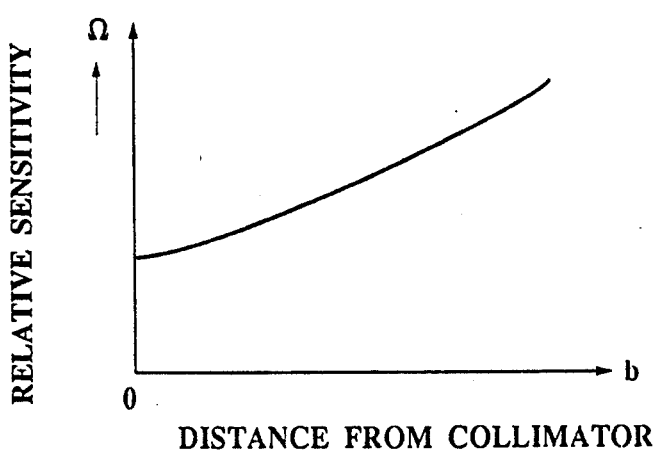
FIG. 7 is a graphic representation between a relative sensitivity and a distance from a surface of the collimator.
Figure 8:
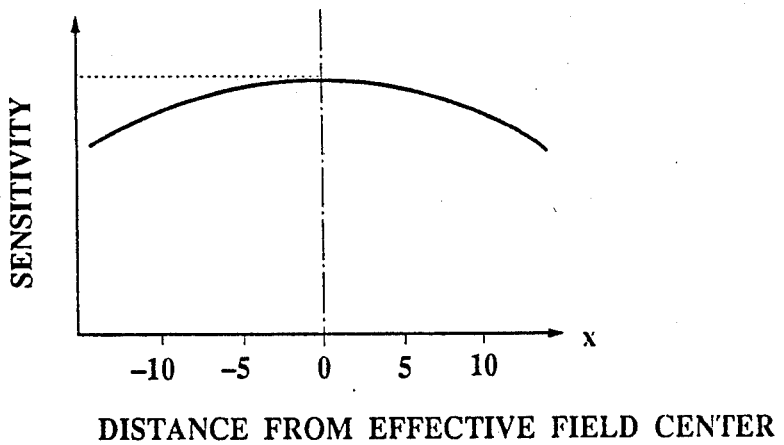
FIG. 8 is a graphic representation between a sensitivity and a distance from an effective field center of the collimator.

As apparent from the above formula (1), the longer the distance measured from the collimator's surface to the point "p" becomes, the greater the sensitivity of the collimator becomes (see FIG. 7. Also, the sensitivity of the collimator becomes greater at a center of the SPECT image ($\Theta = 0$), see FIG. 9) than at a peripheral thereof (see FIG. 8).

Spatial resolution "Rg" and "Rs" of the fan-beam collimator are expressed as follows ("Rg" means geometric spatial resolution, whereas "Rs" implies system spatial resolution):

$$Rg = \frac{(a_\Theta - b + c)d}{a_\Theta} \times \quad (2)$$

$$\frac{1}{2} \left( \frac{1}{\cos \Theta} + \frac{1}{\cos \Theta''} \right) \times \frac{f + a_\Theta/2}{5 + a_\Theta + c}$$

where, $$\Theta = \Theta' - \sin^{-1} \times \left( \frac{d}{a_\Theta} \cdot \frac{b + a_\Theta/2}{f - b} \cdot \cos \Theta' \right)$$

$$\Theta'' = \Theta' - \sin^{-1} \times \left( \frac{d}{a_\Theta} \cdot \frac{b + a_\Theta/2}{f - b} \cdot \cos \Theta' \right)$$

$$Rs = \sqrt{(M \cdot R_i)^2 + R^2} = F_{WH} M \quad (3)$$

where, $$M = \frac{f - b}{f + a_\Theta + c},$$

and $R_i$ = resolution specific to detector.

As a consequence, the blurring function is set in such a manner that it becomes the Gaussian distribution "$\sigma$":

$$\sigma = \frac{F_{WH} M}{2 \times 1.17} \quad (4)$$

Figure 9:
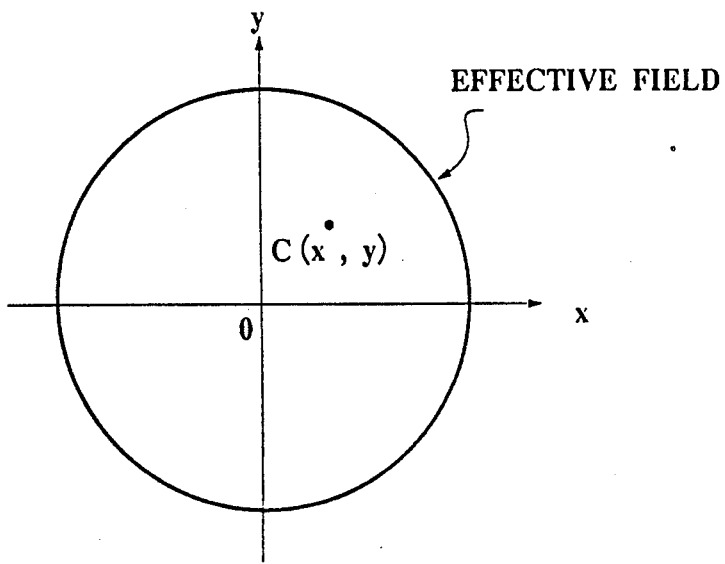
FIG. 9 represents the effective field of the collimator.

Then, projection data on such a sensitivity distribution that the radio isotope has uniformly distributed within the SPECT effective field, may be calculated. When the sensitivity distribution c (x, y) of this SPECT image is calculated, it is represented as shown in FIG. 9.

On the other hand, when the projection data is acquired by a data acquisition unit (will be discussed later), or after the projection data has been acquired, resultant projection data of the biological body under medical examination, which does not contain an adverse influence caused by the scattering/absorbing phenomena, may be obtained under such conditions that a ring-shaped artifact component has been removed by an artifact removing means (will be discussed) from the acquired projection data. After a SPECT image is reconstructed by an image reconstructing unit (will be discussed later) based upon the resultant projection data having no adverse influence, the above-described sensitivity correction of the collimator may be performed.

As represented in FIG. 7, in accordance with a projection distribution P(Θ) of the radio isotope along a direction of l-l', since the radio isotope has been distributed between "l" and "l'", the projection data is acquired according to the sensitivity/resolution characteristics of this position. No information on the length or the like of the distribution l-l' cannot be obtained from the thus acquired projection data, so that the sensitivity correction cannot be performed. As a consequence, since the sensitivity correction may not be executed unless the distribution position has been judged, it may be recognized that the above-described sensitivity correction should be performed on the reconstructed SPECT image.

(B) Occurrence and Elimination of Ring-Shaped Artifact

Figure 10:
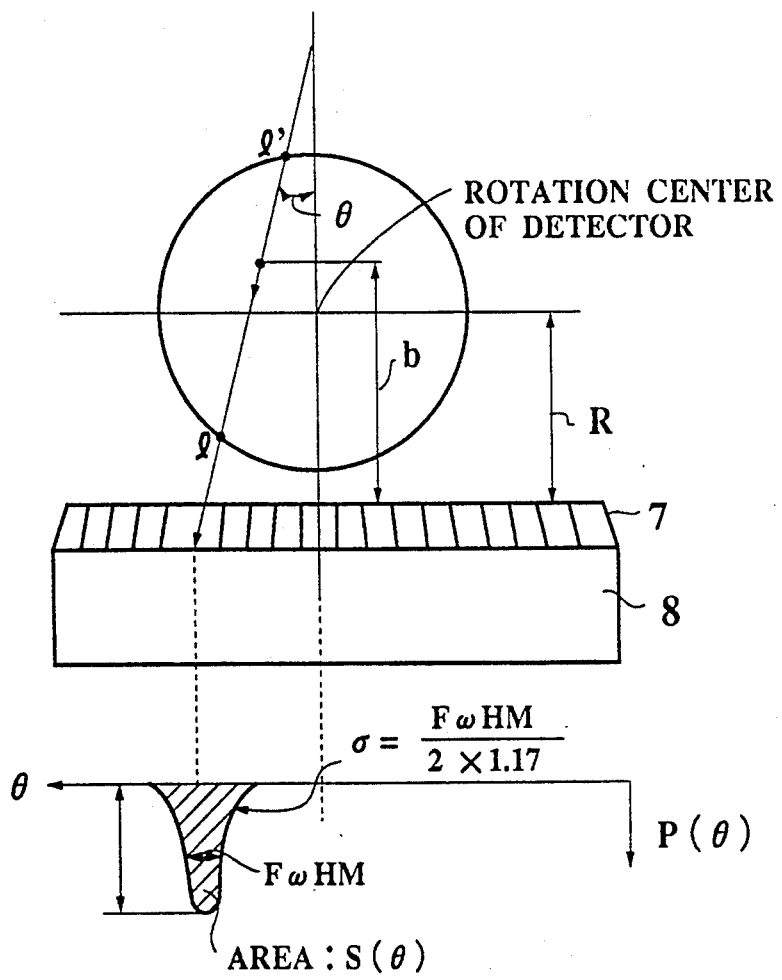
FIG. 10 is an illustration for explaining a step to conduct formulae required for eliminating the ring-shaped artifact and correcting the sensitivity based upon the basic idea of the present invention.

In FIG. 10, a profile integrating value (i.e., an area "S(Θ)" of an RI (radio isotope) image is defined as follows, which is projected from RI Ci(l) uniformly distributed into the fan-beam collimator 7 and effective field toward a direction of "Θ":

$$S(\Theta) = \int_{l}^{l'} \left[ \frac{kd^2}{a_\Theta (d + t)} \right]^2 \cos^2 \Theta \times \frac{f}{f - b(l)} \cdot Ci(l) \cdot dl \quad (5)$$

If the higher mechanical precision of the focusing function of this fan-beam collimator 7 can be achieved, this integral may be modified as in the below-mentioned formula (6):

$$S(\Theta) = \left[ \frac{kd^2}{a_\Theta (d + t)} \right]^2 \cos^2 \Theta \quad (6)$$

$$\int_{l}^{l'} \frac{f}{f - b(l)} \cdot Ci(l) \cdot dl$$

For the sake of simplicity, this integral S(Θ) is expressed by *1 (variable part) and *2 (constant part):

$$*1 = \int_{l}^{l'} \frac{f}{f - b(l)} \cdot Ci(l) \cdot dl$$

$$*2 = \left[ \frac{kd^2}{a_\Theta (d + t)} \right]^2 \cos^2 \Theta$$

*1 is a variable part, and therefore is subjected to the enlarge effect of the fan beam, depending upon the distribution position of RI.

*2 is a constant part, and represents that this term of the entire integral S(Θ) produces a difference in the sensivity distribution which may cause the ring-shaped artifact when the shape parameters (a, d, t) of the fan-beam collimator 7 have different values, depending upon "Θ" of the machining errors.

In other words, the term *1 of the entire integral S(Θ) is varried, whereas the term *2 thereof is constant.

As a consequence, if the formula portion of $kd^2/a_\Theta(d+t)$ in this constant part *1 is set to be a constant value irrelevant to the positions with respect to the projection image, the ring-shaped artifact caused by the fan-beam collimator 7 may be removed or eliminated from the acquired projection image data.

Therefore, the Inventor could recognize such a fact, i.e., *1 being set to be constant and the present invention could be accomplished based upon such recognition.

In accordance with an arrangement (will be discussed) of a SPECT apparatus of the invention, both the ring-shaped artifact component may be precisely eliminated from the acquired projection image data and the uneven sensitivity mainly caused by the fan-beam collimator may be accurately corrected based upon the above-described basic ideas "A" and "B".

OVERALL ARRANGEMENT OF FIRST SPECT APPARATUS

Figure 1:
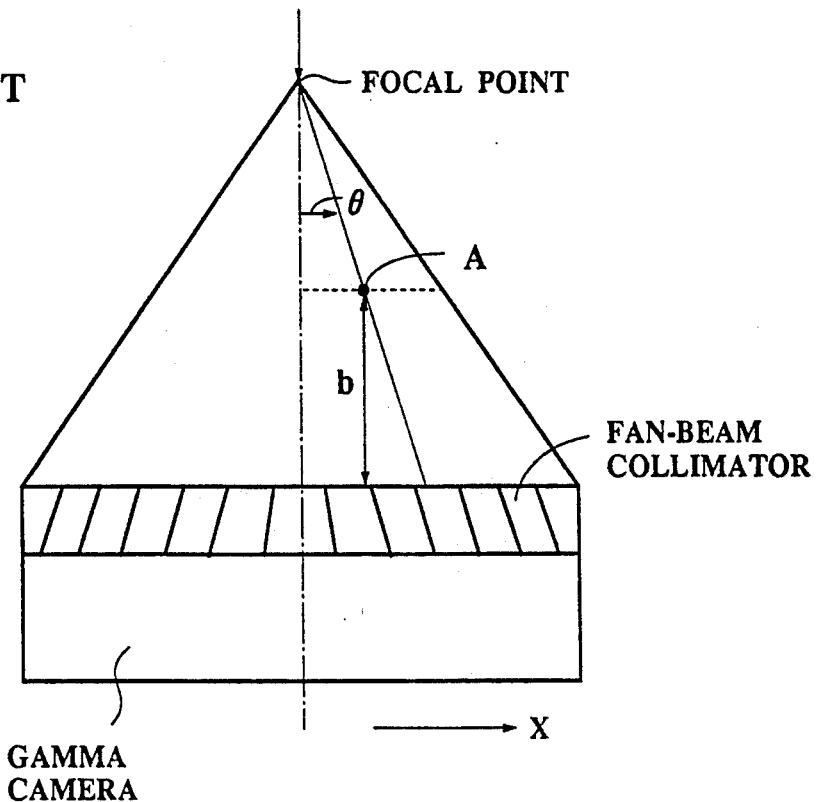
FIGS. 1 to 3 schematically illustrate inherent problems and corrections of the conventional SPECT apparatus.
Figure 2:
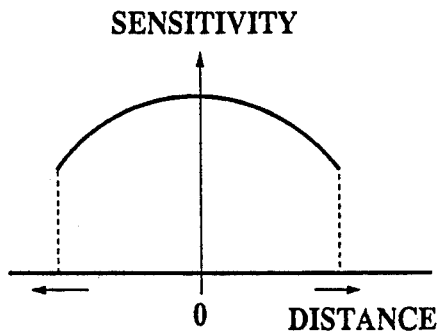
Figure 3:
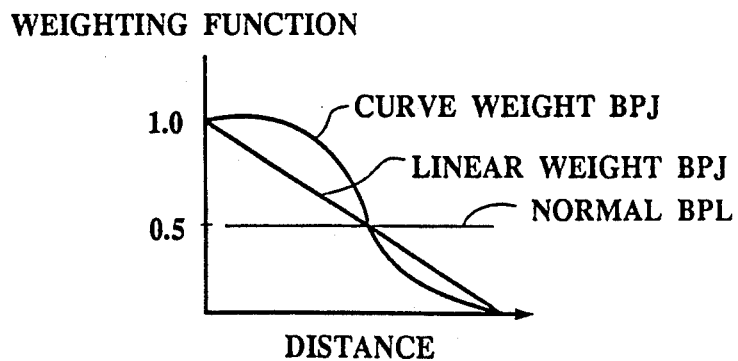
Figure 4:
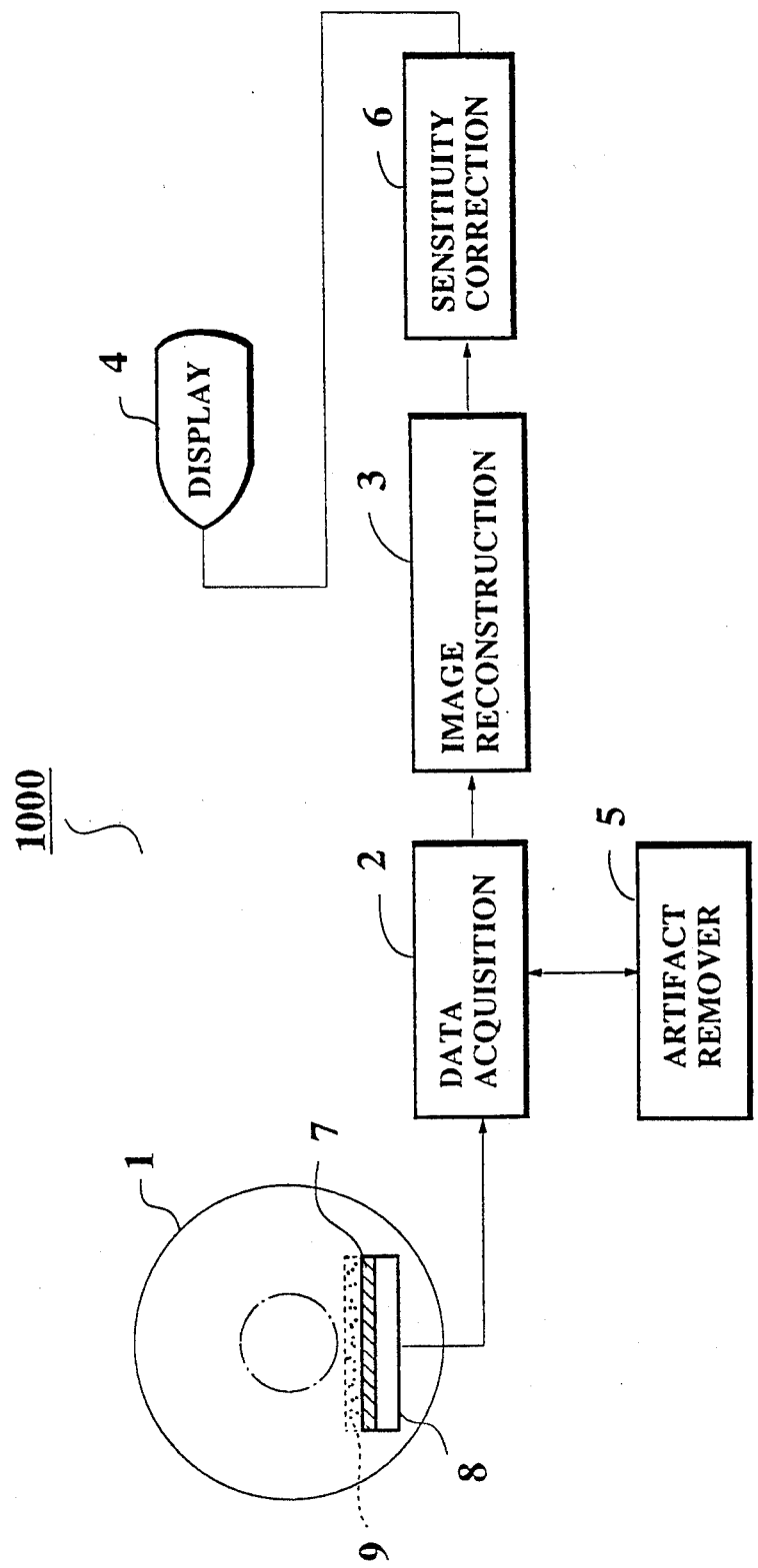
FIG. 4 is a schematic block diagram of an overall arrangement of a SPECT apparatus 1000 according to a preferred embodiment of the present invention.

Referring now to FIG. 4, an overall arrangement of a SPECT (single photon emission computerized tomographic) apparatus 1000 according to a first preferred embodiment of the present invention will be described. The major arrangement of the first SPECT apparatus 1000 comprises a stand 1; a fan-beam collimator 7 positioned on a gamma camera 8; a data acquisition unit 2 for receiving a projection image signal derived from the gamma camera 8; an image reconstruction unit 3 for reconstructing a SPECT image from the acquired projection image data; and a display unit 4 for displaying the SPECT image of a biological body under medical examination (not shown in detail). Furthermore, the SPECT apparatus 1000 includes as a featured arrangement, an artifact removing or eliminating unit 5 connected to the data acquisition unit 2, and a sensitivity correction unit 6 interposed between the image reconstruction unit 3 and the display unit 4.

As explained above, to remove or eliminate the ring-shaped artifact component from the acquired projection image data, this artifact removing unit 5 is employed. Moreover, to correct the sensitivity mainly by caused by the fan-beam collimator 7, the sensitivity correction unit 6 is employed.

The elimination of the ring-shaped artifact component may be performed by the data acquisition unit 2, while utilizing such a recognition that the constant part *2 of the integral S(Θ) as defined in the formula (6) has no relationship with the RI distribution, but is a function with respect to the angle "Θ". That is to say, in case that the component of *2 depends only on the function of the angle "Θ" (see FIG. 6), the cause of occurrence of the ring-shaped artifact becomes such a constant that is determined only by fluctuation in the diameter of the hole of the fan-beam collimator 7, the thickness of the ceptor, and the thickness of the collimator at the angle "Θ". In this case, since the deviation from the desirable value becomes the ring-shaped artifact component, and therefore this deviation is reduced to substantially zero, the ring-shaped artifact component may be finally eliminated from the acquired projection image data.

PLANE RI SOURCE VESSEL

Referring back to the overall arrangement of FIG. 4, how to eliminate the artifact component from the acquired projection image data, according to the present invention, will now be summarized.

First, projection image data are acquired from the gamma camera 8 and the data acquisition unit 2, while projecting gamma rays from a plane or flat RI source vessel via the collimator to a phantom (not shown in detail). Then, the profile integral value S(Θ) of the RI image is calculated based upon the formula (5), whereby the constant part *2 is obtained. Subsequently, a predetermined calculation is furthermore performed with respect to this constant part component, thereby obtaining the artifact removing correction data which will be then stored as a correction table memory (not shown in detail) of the artifact removing unit 5.

Accordingly, to acquire correction data for removing the ring-shaped artifact, a plane RI source vessel 9 as a reference RI source has been employed in such a manner that this vessel 9 is positioned in parallel to the fan-beam collimator 7 in accordance with this preferred embodiment (see FIG. 4).

Figure 11A:
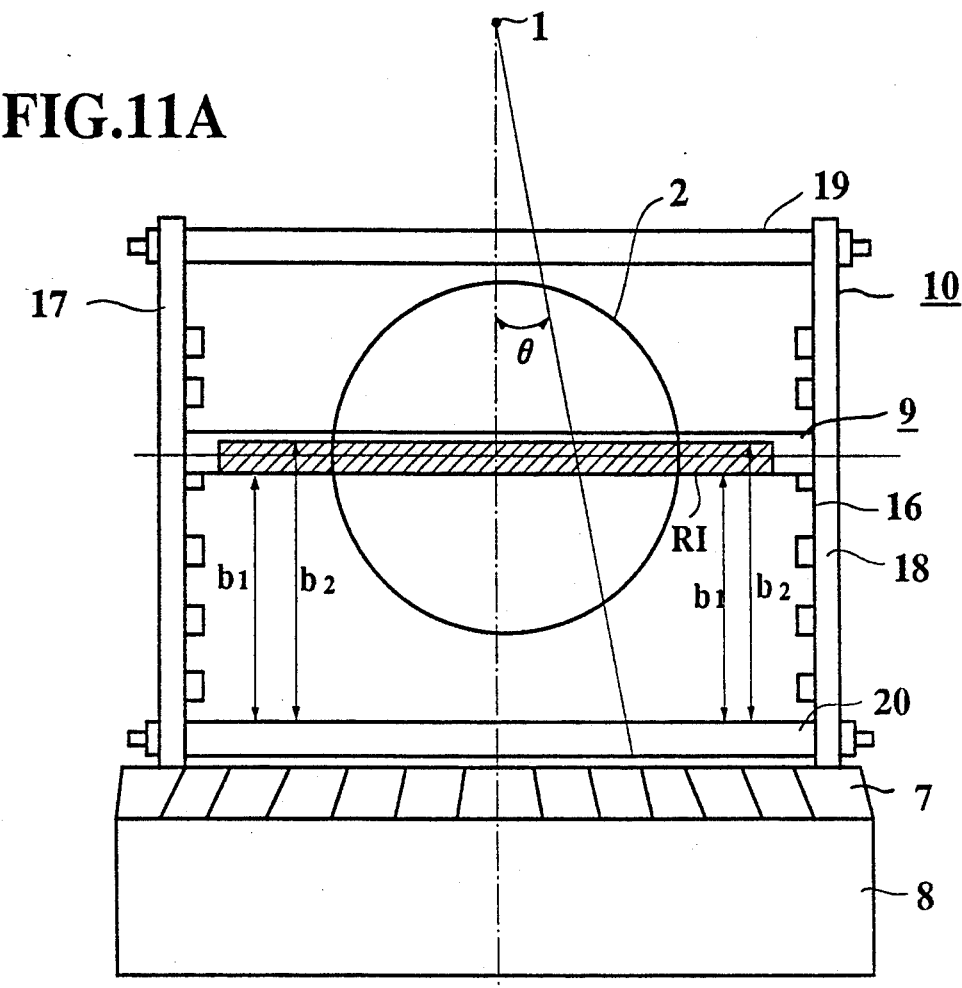
FIGS. 11A and 11B schematically illustrate a plane RI source case position above the collimator of the SPECT apparatus according to the first preferred embodiment.
Figure 11B:
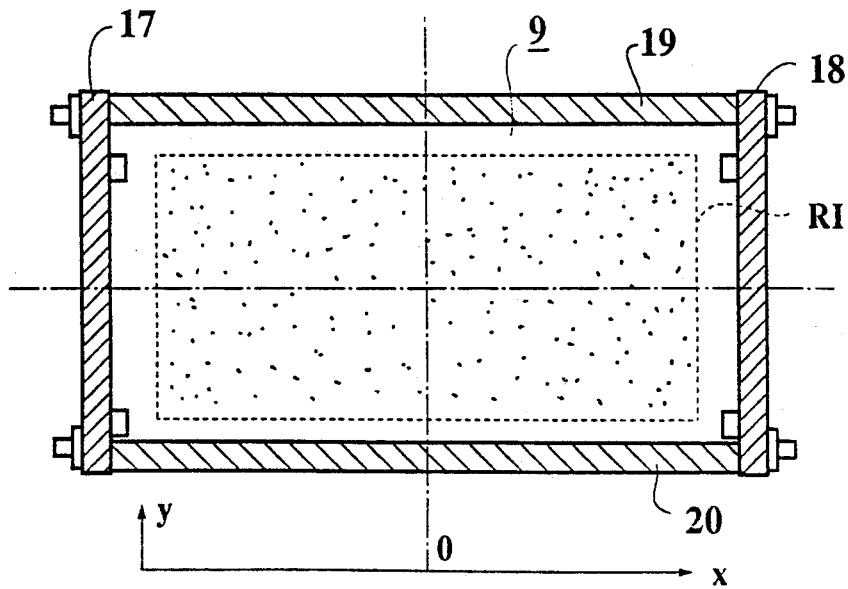

FIG. 11 schematically represents such a construction that the plane RI source vessel 9 is positioned in parallel with the fan-beam collimator 7 by employing a supporting shelf 10. More specifically, FIG. 11A is a front view of this construction and FIG. 11B is a top view thereof.

Figure 12:
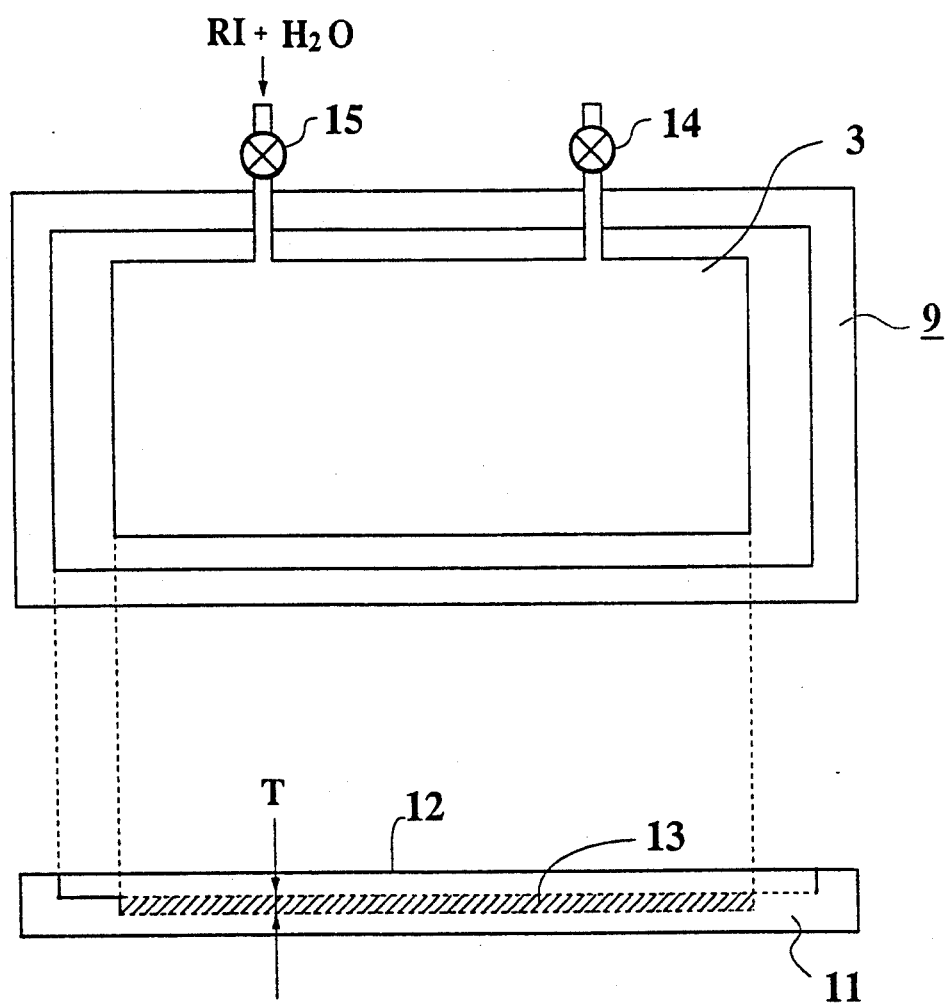
FIG. 12 schematically illustrates a structure of the plane RI source case shown in FIGS. 11A and 11B.

FIG. 12 schematically represents construction members of the plane RI source vessel 9. The vessel 9 is fabricated by an aluminium vessel body 11, a completely flat glass layer 12, and an RI vessel unit 13. Furthermore, two valves 14 and 15 are provided with the RI vessel unit 13, through which water and an RI are injected. As previously explained, the surfaces of these aluminium vessel body 11 and glass layer 12 are made completely flat so as to make a thickness "T" of the RI vessel unit 12 constant.

The supporting shelf 10 is constructed of side plates 17 and 18 into which supporting grooves 16 are symmetrically formed with respect to the horizontal direction, and also side plates 19 and 20 capable of maintaining the above-described parallel condition of these side plates 17 and 18.

Under such a condition that the plane RI source vessel 9 has been inserted into the supporting grooves 16 of the side plate 17 and 18 employed in the supporting shelf 10, this supporting shelf 10 is positioned above the fan-beam collimator 8, so that the plane RI source vessel 9 may be precisely positioned in a parallel condition with respect to the surface of the fan-beam collimator 8.

CONDITIONS FOR OBTAINING CORRECTION DATA TO ELIMINATE ARTIFACT

As a consequence, the following various conditions to correctly acquire the correction data for removing the ring-shaped artifact may be maintained.

1ST CONDITION

When the plane RI source vessel 9 is set to the fan-beam collimator 7, it is required to a correct distance from the detecting surface of the gamma camera 8 (i.e., the surface of the fan-beam collimator 7) under such a parallel state.

2ND CONDITION

A thickness of the RI vessel unit 13 of the plane RI source vessel 9, "$b_2-b_1$" (see FIG. 11A) must be selected to be constant over the entire area and also be very thin, whereby absorption of gamma ray may be negligible.

Figure 13A:
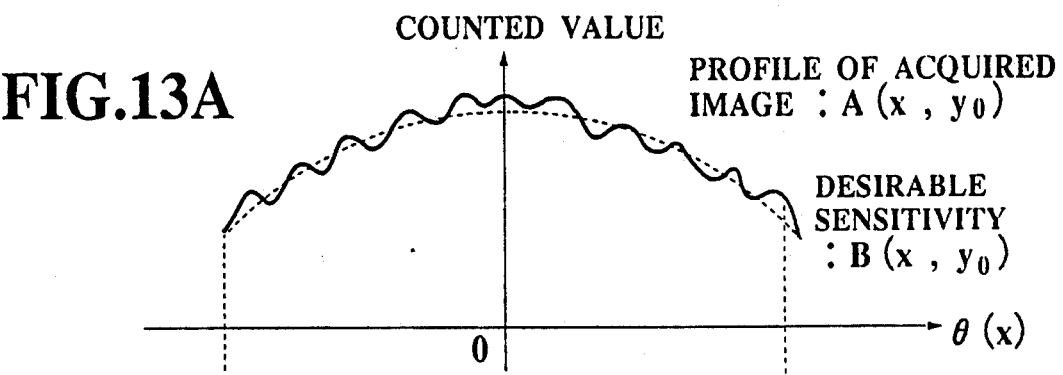
FIGS. 13A to 13C are illustrations for explaining a step to obtain artifact elimination data.

While the first and second conditions are satisfied, gamma rays emitted from the RI vessel unit 13 of the plane (reference) RI source vessel 9 is detected via the fan-beam collimator 7 by the gamma camera 8. As a result, uniform image data obtained by the data acquisition unit 2, the characteristic of which is represented by A $(x, y_o)$ of FIG. 13A, is divided by sensitivity distribution data of the plane RI source which is obtained from the formula (5) (calculation on sensitivity) and represented by a dot line of FIG. 13A (i.e., B $(x, y_o)$). As a quotient of this division, distribution data as defined by a ring component U $(x, y_o)$ is obtained (see FIG. 13B). Based upon this ring component U $(x, y_o)$, an inverse of this component, namely 1/U $(x, y_o)$ calculated. The inverse of the ring component, i.e., 1/U $(x, y_o)$ (see FIG. 13C) is used as the correction data which is multiplied by the projection data so as to eliminate the ring-shaped artifact therefrom, and therefore stored in a table (not shown in detail) of the artifact removing unit 5.

When the correction data are acquired under the above-data are acquired under the above-described conditions and stored within the correction table of the artifact removing unit 5, only the uneven image data component which may cause the ring-shaped artifact defined by the term *1 of the equation (6) and due to fluctuation in the machining precision may be eliminated from the acquired image data irrelevant to the term *2 of the equation (6) and also without giving an adverse influence to the sensitivity characteristic by "Θ" and "b" of the fan-beam collimator 7.

In summary, the plane RI source vessel 9 is first set to a predetermined position so as to acquire the correction data by perform a predetermined calculation, which will be stored as the correction data into the correction table memory of the artifact removing unit 5. Thereafter, the plane RI source vessel 9 is taken out from the collimator 7 and alternatively the biological body under medical examination is set to this SPECT apparatus 100 in order to acquired projection data thereof. Thus, the acquired projection data is multiplied by the correction data so that the ring-shaped artifact component may be finally eliminated from the acquired projection data.

In FIG. 14, there is shown a flowchart for explaining a production of the uniformity (artifact) correction data.

In the flowchart of FIG. 14, at a step S-10, image data of the very thin plane RI source vessel 9 is acquired under the known distance "b" (rotation center) measured from the surface of the collimator 7. At the next step S-12, a calculation is made of B $(x, y_o)$ based upon the distance "b". In this calculation, symbol "h" is determined in such a way that based on an average value of several pixels at a center of A $(x, y_\theta)$, A=B. Then, another calculation is carried out at a step S-14. At a subsequent step S-16, an uniformity correction data is produced by obtaining the inverse of U $(x, y_o)$. Finally, the calculated uniformity correction data is stored into the correction table memory at a step S-18.

SENSITIVITY CORRECTION

As previously stated, based upon the projection image data from which the ring-shaped artifact component has been removed, a SPECT image is reconstructed in the image reconstruction unit 3 shown in FIG. 4. In the sensitivity correction unit 6 for correcting the sensitivity of the fan-shaped collimator 7, sensitivity correction data is formed by utilizing the reconstructed SPECT image data in accordance with a process operation as defined in a flowchart represented in FIG. 15, and thereafter stored into a sensitivity correction table memory (not shown in detail). Subsequently, the sensitivity mainly caused by the collimator 7 is corrected based upon the sensitivity correction data stored in the sensitivity correction table memory in accordance with a flowchart shown in FIG. 16.

Figure 15:
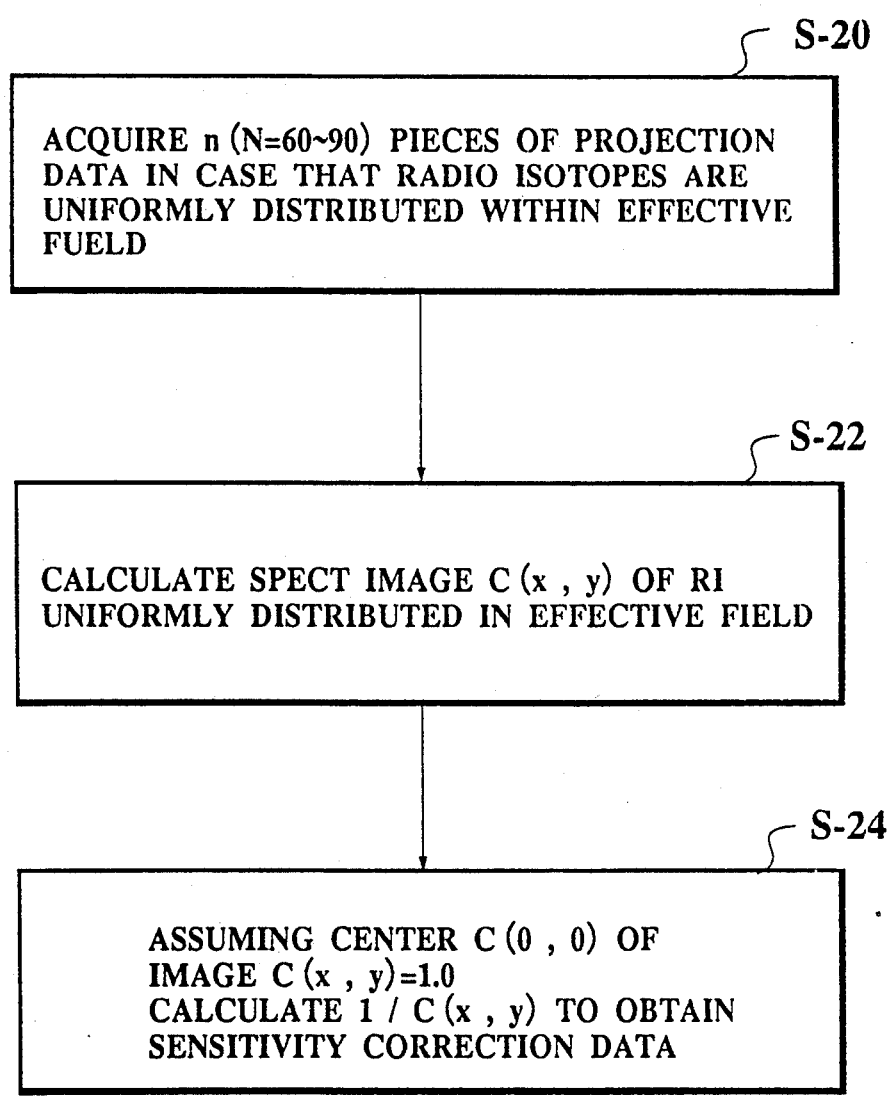
FIG. 15 is a schematic block diagram of a detailed arrangement of the SPECT apparatus 1000.
Figure 17:
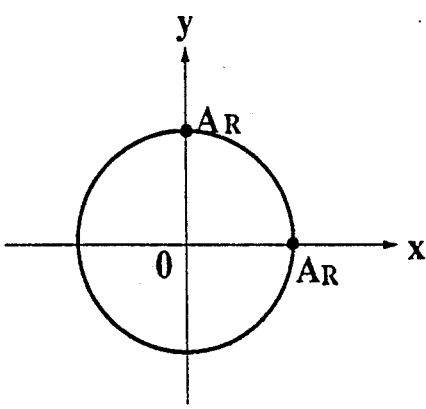
FIG. 17 is a flowchart for explaining a step for correcting the SPECT image effect in the SPECT apparatus 1000.

In the process operation of the sensitivity correction data acquisition as defined in the flowchart of FIG. 15, "n" pieces ("n" being a divisor of 360, i.e., quantity of projection data) of projection data. At a next step S-22, a SPECT image: C (x, y) of the radio isotope which has been uniformly distributed within the effective field shown in FIG. 17, is calculated based upon the fan-beam projection data. Next, assuming now that a center (0, 0) of the SPECT image C (x, y) is equal to 1.0, a calculation is made of inverse of C (x, y), namely 1/C (x, y). The resultant inverse value 1/C (x, y) is used as the above-described sensitivity correction data at a step S-24, and stored in a sensitivity correction table memory (not shown in detail) of the sensitivity correction unit 6.

Figure 16:
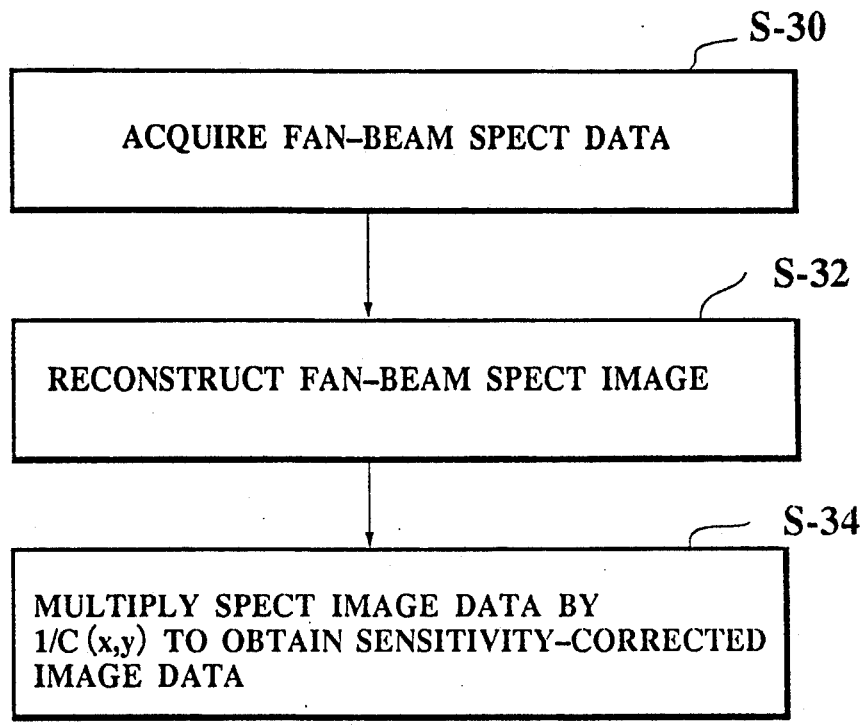
FIG. 16 is a flowchart for explaining a step to obtain sensitivity correction table data.

After thus obtained sensitivity correction data has been stored into the correction table memory, the sensitivity correction may be carried out in the process operation shown in FIG. 16.

In the flowchart of FIG. 16, fan-beam SPECT data is acquired as clinical data at a step S-30. Thereafter, a fan-beam SPECT image as being 0 (x, y) is reconstructed at a step S-32. The obtained SPECT image is reconstructed at a step S-33. Then, an image=0 (x, y) x 1/C (x, y) is obtained by multiplying the SPECT image data by the inverse value of 1/C (x, y) at a step S-34.

CALCULATION ON SENSITIVITY CORRECTION TABLE DATA

Figure 18:
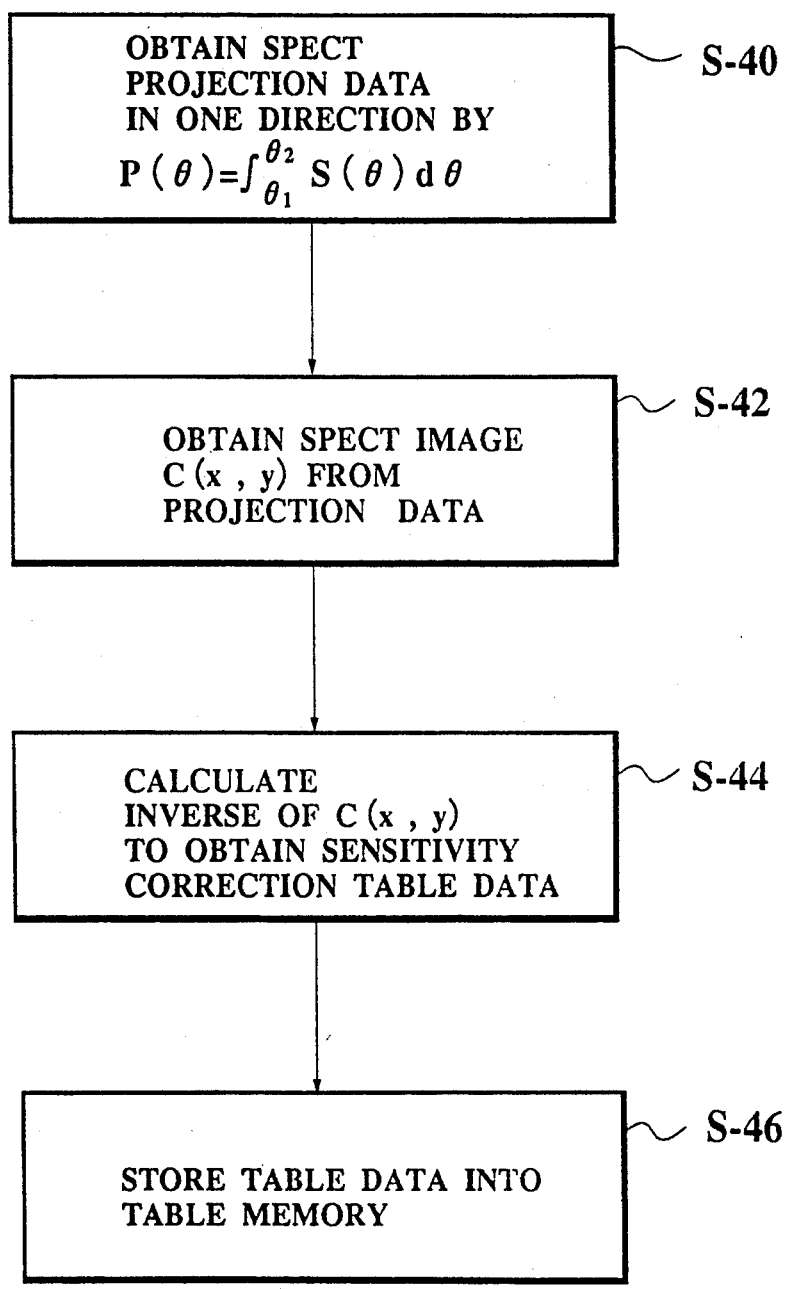
FIG. 18 illustrates an effective field.

FIG. 18 is a flowchart for calculating the sensitivity correction table data. At a first step S-40, SPECT projection data in one direction is obtained based upon equation (7):

$$P(\Theta) = \int_{\Theta_1}^{\Theta_2} S(\Theta) \, d\Theta \quad (7)$$

where symbols "$\Theta_1$" and "$\Theta_2$" are maximum fan open angles. Then, a SPECT image C (x, y) is obtained based upon the above-described projection data at a step S-42. Subsequently, inverse of the SPECT image C (x, y) is calculated so as to obtain the sensitivity correction table data at a step S-44. Finally, the resultant sensitivity correction table data is stored into a sensitivity correction table memory (not shown in detail) employed in the sensitivity correction unit 6 at a step S-46.

FUNCTIONAL BLOCK DIAGRAM OF FIRST SPECT APPARATUS

Figure 19:
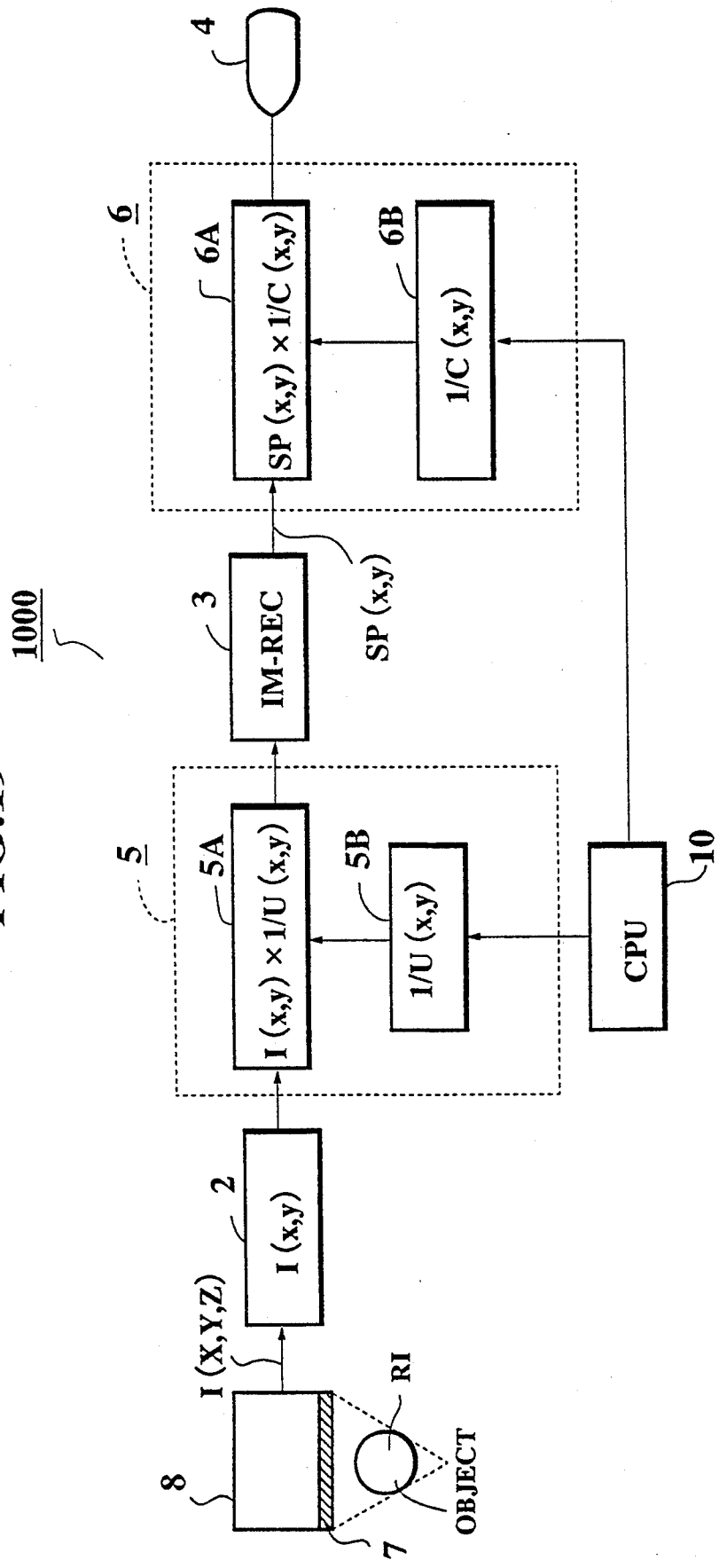
FIG. 19 is a flowchart for explaining a calculation of the sensitivity correction table.

In FIG. 19, there is shown a functional block diagram of the SPECT apparatus 1000 according to the first preferred embodiment of the present invention.

For a better understanding of the above-described various functions of this apparatus 1000, this block diagram may be helpful. It should be noted that the same reference numerals shown in FIG. 19 denote the same or similar circuit units shown in FIG. 4 and therefore no further explanation thereof is made in the following description.

Only the featured arrangements will now be described. The artifact removing unit 5 includes a first image data processing section 5A for mainly performing the multiplication between I (x, y) and 1/U (x, y), and an uniformity correction table memory 5B for storing the above-described uniformity (artifact) correction data 1/U (x, y). Also, the sensitivity correcting unit 6 includes a second image data processing section 6A for mainly executing the multiplication between SP (x, y) and 1/C (x, y), and a sensitivity correction table memory 6B for storing the above-explained sensitivity correction data 1/C (x, y). Furthermore, a central processing unit (CPU) 10 is employed so as to control both the uniformity correction table memory 5B and sensitivity correction table memory 6B.

Figure 20:
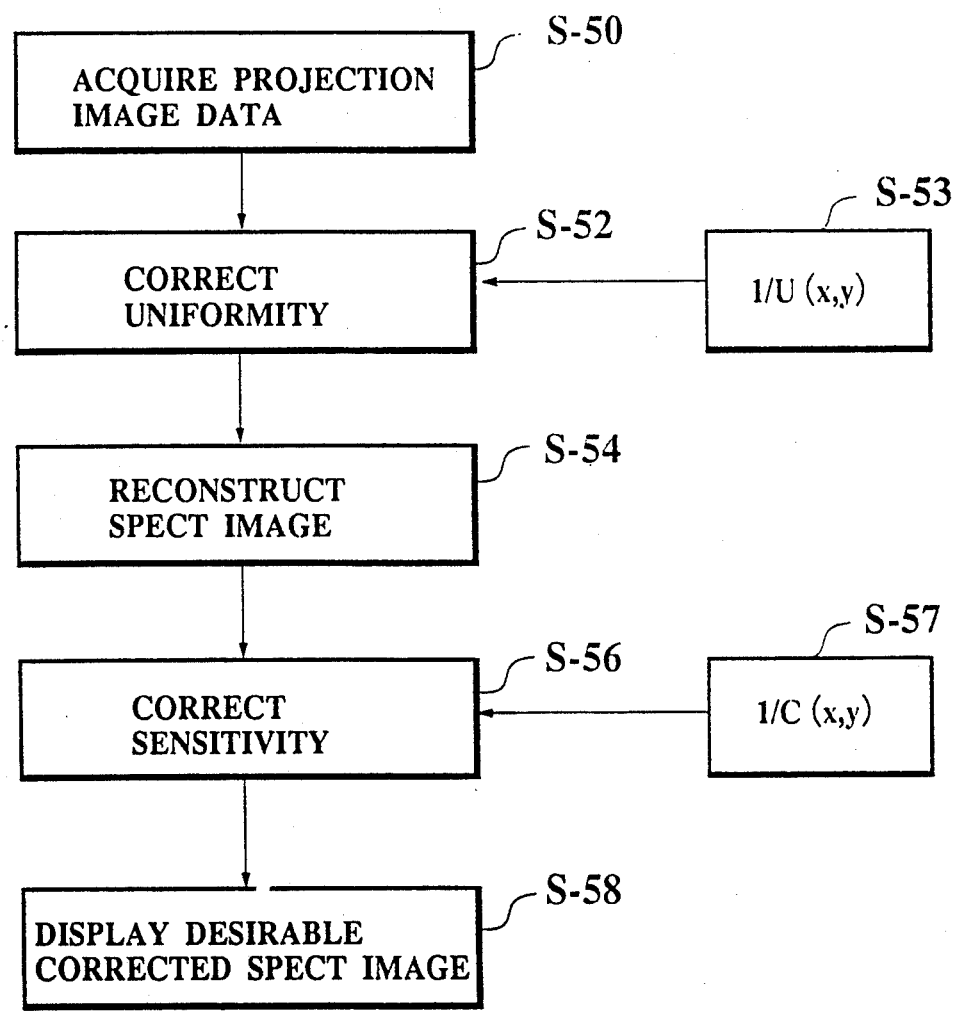
FIG. 20 is a flowchart for explaining an overall process operation of the SPECT apparatus 1000; and, FIGS. 21 to 23 are illustrations of another SPECT apparatus according to the present invention.

FIG. 20 is a flowchart for briefly explaining an overall system operation of the first SPECT apparatus 1000. It should be noted that both of the uniformity correction data and the sensitivity correction data have been calculated and stored into the corresponding correction table memories 5B and 6B. At a first step S-50, projection image data is acquired in the image acquisition unit 2. At next steps S52 and S53, the uniformity (namely, artifact component) is corrected by utilizing the uniformity (artifact) correction data read out from the correction table memory 5B in the first image processing section 5A. Then, a SPECT image is reconstructed based upon the uniformity-corrected projection image data in the image reconstruction unit 3. Subsequently, the sensitivity correction is carried out for the reconstructed SPECT image data in conjunction with the sensitivity correction table memory 6B at steps S-56 and S-57. Thus, the desirable corrected SPECT image data may be obtained and displayed at a step S58.

As previously described in detail, according to the first preferred embodiment, after removing or eliminating the ring-shaped artifact component from the acquired projection image data, the sensitivity of the fan-beam collimator may be corrected with respect to the reconstructed SPECT image data. Also, it is apparent to perform only the elimination of the artifact component, whereby the desirable merit of the present invention may be achieved to a certain extent.

SECOND SPECT APPARATUS

Figure 21:
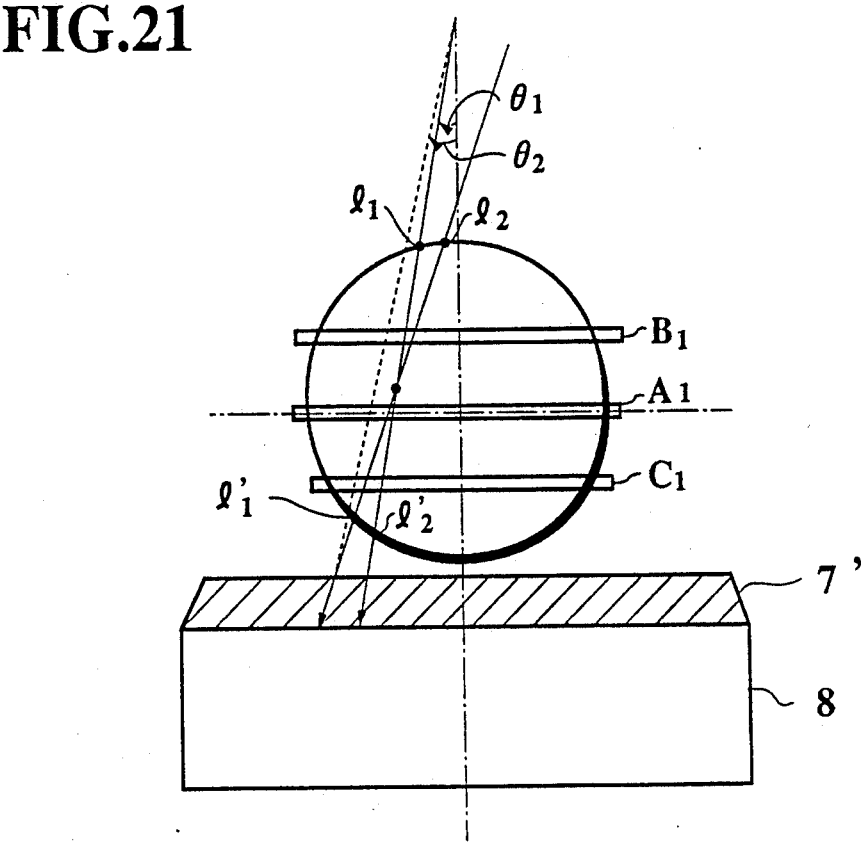

Another SPECT apparatus according to a second preferred embodiment will now be described in which machining precision in focusing of a fan-beam collimeter 7 is not so higher than that of the first preferred embodiment, with reference to FIGS. 21 to 23. An overall construction of the second SPECT apparatus similarly employs both the artifact removing unit 5 and the sensitivity correcting unit 6 together with other conventional signal processing units as explained in FIG. 4.

In case that the higher machining precision in the focusing of the fan-beam collimeter 7' is not achieved, the above-described formula (5) cannot be modified into the formula (6).

Assuming now that the plane RI source vessel 9 is positioned at three setting positions $A_1$, $B_1$, $C_1$, namely two setting positions $B_1$ and $C_1$ with respect to a center setting position $A_1$, focus lines $l_1 l_1'$ and $l_2 l_2'$ intersect with each other at the center position $A_1$.

Originally, the item f/f-b(l) of the formula (6) is not equal to a function of the angle "A". However, this item is not constant due to the wall thickness "b", but corresponds to a function between "b" and "$\Theta$". As a result, if the angle "$\Theta$" is once determined, the *2 item of the formula (6) has been necessarily determined as a constant value. Nevertheless, while observing the $l_2 l_1$ line, the *2 item is not positioned on the line of "$\Theta_2$" depending upon the setting positions $A_1$, $B_1$, $C_1$, and may not be recognized as a constant due to the angle "$\Theta_2$".

Figure 22:
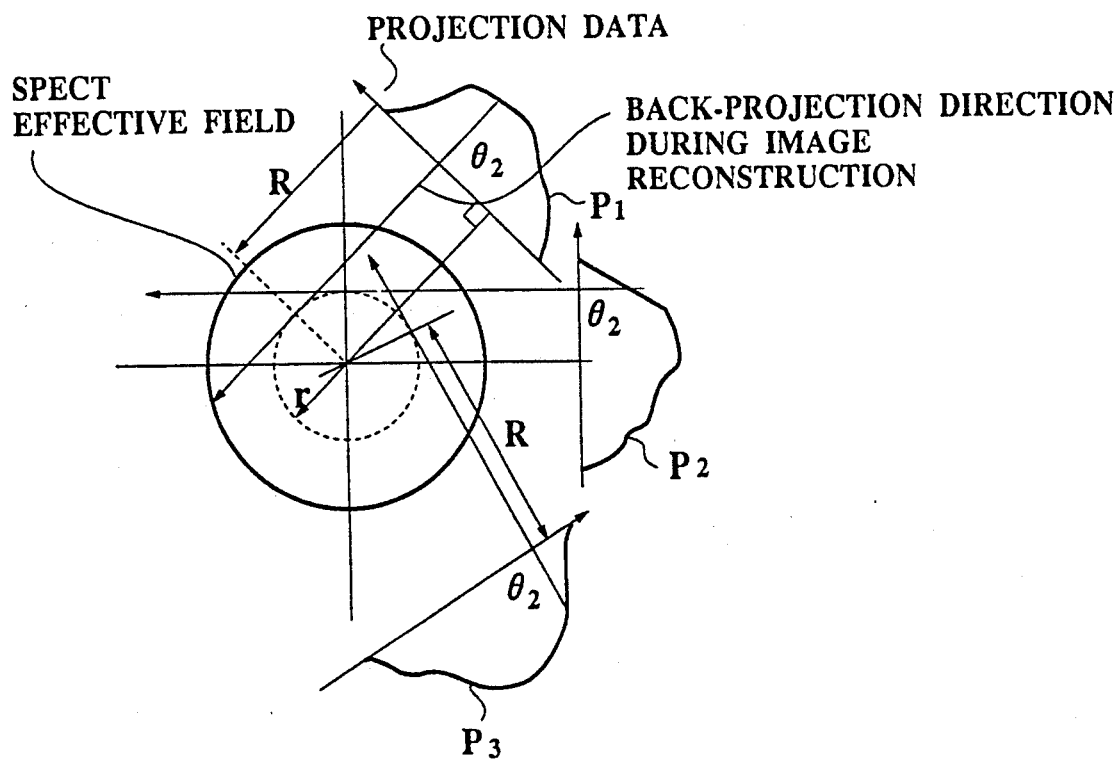

On the other hand, after the fan-beam SPECT image has been transformed into parallel beam projection data, and reconstructed, as represented in FIG. 22, projection data along a direction of the angle "$\Theta_2$" is continuously back-projected onto the same circle "r". As a result, a ring-shaped artifact may happen to occur.

At this time, it may be understood that the uneveness signal components caused by the fan-beam collimator 7' and overall system thereof obtained from the plane RI source vessel 9 positioned at the rotation radius "R" mainly cause the ring-shaped artifact.

According to the second SPECT apparatus, when the fan-beam collimator 7' having the lower machining precision of focussing is employed, the correction data for removing the ring-shaped artifact component from the acquired projection image data is produced from such uneven projection image data which is acquired under conditions that the plane RI source vessel 9 is positioned at a center of the SPECT effective field, namely a place apart from the surface of the collimator 7' by the rotation radius "R", and parallel to the collimator's surface (see FIG. 22).

Figure 13B:
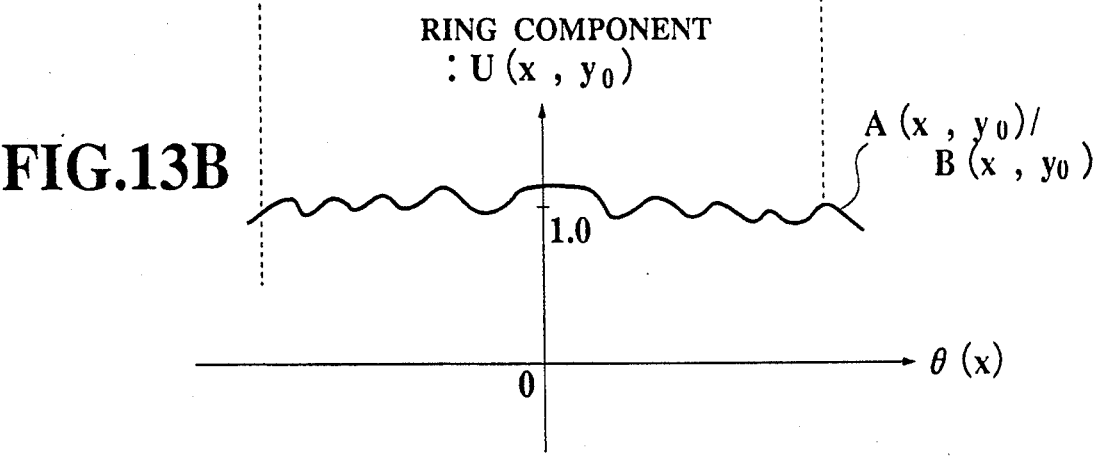
Figure 13C:
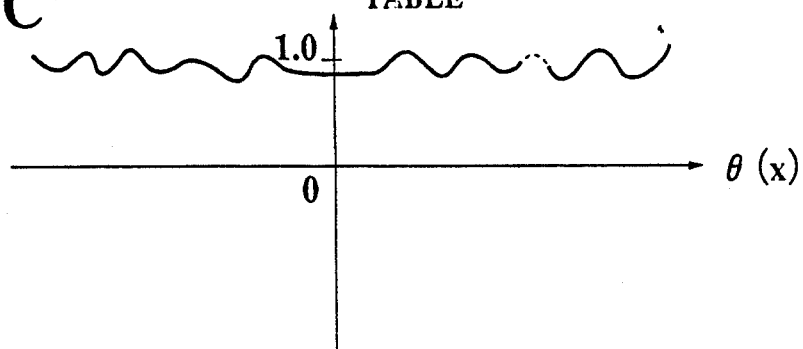
Figure 23:
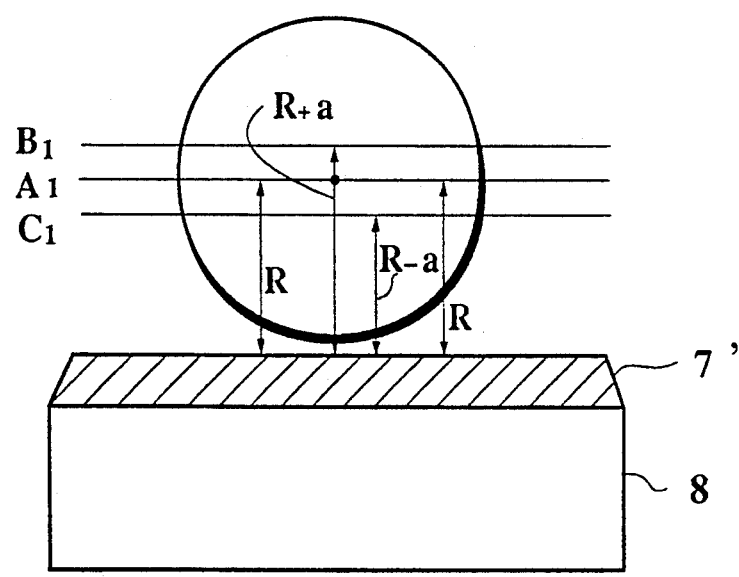

Furthermore, when the focussing of the fan-beam collimator 7' represents an irregular characteristic, as illustrated in FIG. 23, for instance, not only the uneven projection image data is acquired at the center of the effective field, but also two sets of uneven projection data are acquired at two different positions "$B_1$" and "$C_1$" with respect to a position "$A_1$", i.e., the center of the effective field. Then, the uniformity correcting process as defined in FIGS. 13A and 13B is carried out for these uneven projection data. Subsequently, the process as defined in FIG. 13C is performed to add the image thereto so as to obtain desirable uniformity correction data.

As previously described in detail, according to the present invention, the ring-shaped artifact component mainly caused by the fan-beam collimator may be precisely eliminated from the acquired projection image data of the biological body. Also, the sensitivity of the collimator may be uniformly corrected. The plane RI source vessel may be employed so as to obtain the artifact correction data and also sensitivity correction data.

What is claimed is:

1. A method for acquiring single photon emission computerized tomographic (SPECT) image data by receiving via a fan-beam collimator, radiation emitted from a radio isotope (RI) supplied into a biological body under medical examination with employment of a gamma camera, comprising the steps of:
    acquiring first projection image data by receiving via the fan-beam collimator, radiation emitted from reference RI source means;
    processing said first projection image data to obtain first correction data;
    acquiring second projection image data by receiving via said fan-beam collimator said radiation emitted from said radio isotope injected into the biological body;
    correcting said second projection image data with said first correction data so as to obtain third projection image data from which an artifact component has been eliminated; and
    reconstructing a SPECT image of the biological body under medical examination based upon said third projection image data and free from the artifact component, including
    calculating a plurality of fourth projection image data by receiving via the fan-beam collimator radiation emitted from radio isotopes uniformly distributed within an effective field of said gamma camera so as to obtain SPECT image data of the radio isotopes uniformly distributed within the effective field,
    processing said SPECT image data of the radio isotopes to obtain second correction data; and
    correcting said reconstructed SPECT image of the biological body based upon said second correction data, whereby a sensitivity of at least said fan-beam collimator is corrected on said reconstructed SPECT image of the biological body under medical examination.

2. A method as claimed in claim 1, further comprising the step of:
    storing said second correction data in a second table memory as sensitivity correction data.

3. A method for acquiring single photon emission computerized tomographic (SPECT) image data by receiving via a fan-beam collimator, radiation emitted from a radio isotope (RI) supplied into a biological body under medical examination with employment of a gamma camera, comprising the steps of:
    acquiring first projection image data by receiving via the fan-beam collimator, radiation emitted from reference RI source means;
    processing said first projection image data to obtain first correction data;
    acquiring second projection image data by receiving via said fan-beam collimator said radiation emitted from said radio isotope injected into the biological body;
    correcting said second projection image data with said first correction data so as to obtain third projection image data from which an artifact component has been eliminated; and reconstructing a SPECT image of the biological body under medical examination based upon said third projection image data and free from the artifact component;
    wherein said reference RI source means is constructed of an RI source vessel having parallel-positioned flat glass plates.

4. A method for acquiring single photon emission computerized tomographic (SPECT) image data by receiving via a fan-beam collimator, radiation emitted from a radio isotope (RI) supplied into a biological body under medical examination with employment of a gamma camera, comprising the steps of:
    acquiring first projection image data by receiving via the fan-beam collimator, radiation emitted from reference RI source means;
    processing said first projection image data to obtain first correction data;
    acquiring second projection image data by receiving via said fan-beam collimator said radiation emitted from said radio isotope injected into the biological body;
    correcting said second projection image data with said first correction data so as to obtain third projection image data from which an artifact component has been eliminated; and reconstructing a SPECT image of the biological body under medical examination based upon said third projection image data and free from the artifact component;

wherein said first projection image data are acquired by receiving via the fan-beam collimator, a plurality of radiation emitted from said reference RI source means which is positioned at not only a rotation center of said fan-beam collimator, but also a place adjacent said rotation center.

5. A single photon emission computerized tomographic (SPECT) image apparatus comprising:

data acquiring means for acquiring both first projection image data by receiving via a fan-beam collimator, first radiation emitted from a source of a reference radio isotopes, and also second projection image data by receiving via the fan-beam collimator, second radiation emitted from a radio isotope injected into a biological body under medical examination, with employment of a gamma camera;

artifact removing means for processing said first projection image data to obtain first correction data, and for correcting said second projection image data based upon said first correction data to obtain third projection image data from which an artifact component has been removed;

reconstructing means for reconstructing a SPECT image of the biological body under medical examination based on said third projection image data and free from the artifact component;

wherein said reference radio isotope source used for removing the artifact component from the second projection image data is arranged by at least a vessel constructed of a vessel body and two sets of parallel-positioned flat glass plates for sandwiching the reference radio isotopes within the vessel having a constant thickness.

6. A SPECT image apparatus as claimed in claim 5, wherein said reference radio isotope source means further employs two sets of valves through which both the reference radio isotopes and water are injected.

7. A single photon emission computerized tomographic (SPECT) image apparatus comprising:

data acquiring means for acquiring both first projection image data by receiving via a fan-beam collimator, first radiation emitted from a source of a reference radio isotopes, and also second projection image data by receiving via the fan-beam collimator, second radiation emitted from a radio isotope injected into a biological body under medical examination, with employment of a gamma camera;

artifact removing means for processing said first projection image data to obtain first correction data, and for correcting said second projection image data based upon said first correction data to obtain third projection image data from which an artifact component has been removed;

reconstructing means for reconstructing a SPECT image of the biological body under medical examination based on said third projection image data and free from the artifact component; and sensitivity correcting means for calculating a plurality of fourth projection image data by receiving via the fan-beam collimator, radiation emitted from radio isotopes uniformly distributed within an effective field of said gamma camera so as to obtain SPECT image data of the radio isotopes uniformly distributed within the effective field, for processing the SPECT image data to produce second correction data, and for correcting said reconstructed SPECT image data of the biological body based upon the second correction data to correct a sensitivity of at least said fan-beam collimator on said reconstructed SPECT image data.

8. A SPECT image apparatus as claimed in claim 7, wherein said sensitivity correcting means includes:

a second table memory for storing therein said second correction data as sensitivity correction data; and a second image data processing unit for processing said reconstructed SPECT image data of the biological body and for sensitivity-correcting said reconstructed SPECT image data of the biological body.

9. A SPECT image apparatus as claimed in claim 7, wherein the number of said fourth projection data is selected to a division of 360.

10. A single photon emission computerized tomographic (SPECT) image apparatus comprising:

data acquiring means for acquiring a plurality of first projection image data by receiving via a fan-beam collimator, a plurality of first radiation emitted from a source of reference radio isotopes which is positioned at not only a rotation center of the fan-beam collimator but also a place adjacent the rotation center, and also for acquiring second projection image data by receiving via the fan-shaped collimator, second radiation emitted from a radio isotope injected into a biological body under medical examination, with employment of a gamma camera;

artifact removing means for processing said plurality of first projection image data to obtain first correction data, and for correcting said second projection image data based upon said first correction data to obtain third projection image data from which an artifact component has been removed; and, reconstructing means for reconstructing a SPECT image of the biological body under medical examination based upon said third projection image data and free from the artifact component, wherein said reference radio isotope source used for removing the artifact component from the second projection image data is arranged by at least a vessel constructed of a vessel body and two sets of parallel-positioned flat glass plates for sandwiching the reference radio isotopes within the vessel having a constant thickness.

11. A SPECT image apparatus as claimed in claim 10, wherein said reference radio isotope source further employs two sets of valves through which both the reference radio isotopes and water are injected.

12. A single photon emission computerized tomographic (SPECT) image apparatus comprising:

data acquiring means for acquiring a plurality of first projection image data by receiving via a fan-beam collimator, a plurality of first radiation emitted from a source of reference radio isotopes which is positioned at not only a rotation center of the fan-beam collimator but also a place adjacent the rotation center, and also for acquiring second projection image data by receiving via the fan-shaped collimator, second radiation emitted from a radio isotope injected into a biological body under medical examination, with employment of a gamma camera;

artifact removing means for processing said plurality of first projection image data to obtain first correction data, and for correcting said second projection image data based upon said first correction data to obtain third projection image data from which an artifact component has been removed;

reconstructing means for reconstructing a SPECT image of the biological body under medical examination based upon said third projection image data and free from the artifact component; and sensitivity correcting means for calculating a plurality of fourth projection image data by receiving via the fan-beam collimator, radiation emitted from radio isotopes uniformly distributed within an effective field of said gamma camera so as to obtain SPECT image data of the radio isotopes uniformly distributed within the effective field, for processing the SPECT image data to produce second correction data, and for correcting said reconstructed SPECT image data of the biological body based upon the second correction data to correct a sensitivity of at least said fan-beam collimator on said reconstructed SPECT image data.

13. A SPECT image apparatus as claimed in claim 12, wherein said sensitivity correcting means includes:
    a second table memory for storing therein said second correction data as sensitivity correction data; and,
    a second image data processing unit for processing said reconstructed SPECT image data of the biological body and for sensitivity-correcting said reconstructed SPECT image data of the biological body.

14. A SPECT image apparatus as claimed in claim 12, wherein the number of said fourth projection data is selected to a division of 360.

15. A system for obtaining a tomographic image of radioisotopes given to a biological object under medical examination, comprising:
    detector means having a fan-beam collimator for allowing gamma-rays from said radioisotopes impinging thereon along fan-shaped directions, and for detecting gamma-rays through said fan-beam collimator to produce projection data;
    scanning means for scanning said biological body, while relatively rotating both of said biological body and said detector means to acquire a plurality of projection data around the biological body;
    reconstructing means for reconstructing a tomographic image from said plurality of projection data;
    memory means for storing sensitivity distribution differences $1/U(X, Y_o)$ from a first ideal sensitivity distribution $B(X, Y_o)$ independent of the positions of said radioisotopes; and
    first correction means for correcting said projection data based on said sensitivity distribution differences.

16. The system as claimed in claim 15, wherein said sensitivity distribution differences $1/U(X, Y_o)$ are obtained by positioning a thin, uniform and flat radioisotope phantom near a center of said relative rotation and parallel to a surface of said detector means.

17. The system as claimed in claim 15, wherein said first ideal sensitivity distribution $B(X, Y_o)$ independent of the positions of said radioisotopes includes $$\int_{l}^{l'} \frac{f}{f - b(l)} Ci(l) \cdot dl$$

where Ci(l) is representative of a thin, uniform and flat radioisotope phantom located near the center of said relative rotation and parallel to a surface of said detector means, f is the focal length of said collimator, and b(l) is the distance from the surface of said detector.

18. The system as claimed in claim 15, wherein said system further includes means for correcting said tomographic image according to a second ideal sensitivity distribution dependent on the positions of said radioisotopes, said second ideal sensitivity distribution dependent of the positions of said radioisotopes being calculated under a condition that radioisotopes are uniformly spread within an area where said tomographic image is reconstructed.

19. The system as claimed in claim 18, wherein said second ideal sensitivity distribution dependent of the positions of said radioisotopes is calculated by equations including $$\int_{l}^{l'} \frac{f}{f - b(l)} Ci(l) \cdot dl$$

where CI(l) is representative of radioisotopes uniformly spreading within an area where said tomographic image is reconstructed, f is the focal length of said collimator, and b(l) is the distance from the surface of said detector.

20. A method for obtaining correction data to eliminate an artifact caused by an error of a fan-beam collimator disposed on detector of SPECT system, comprising the steps of:
    locating a thin, uniform and flat radioisotope phantom parallel to a surface of said fan-beam collimator;
    acquiring gamma rays from said phantom to obtain an actual sensitivity distribution of said fan-beam collimator; and
    comparing an ideal sensitivity distribution calculated under said phantom with said actual sensitivity distribution to produce the correction data for correcting the error of said fan-beam collimator.

21. The method claimed in claim 20, wherein said phantom is located near the rotation center of the detector.

22. The method claimed in claim 21, wherein in said locating step, a plurality of thin, uniform and flat radioisotope phantoms are located parallel to the surface of said fan-beam collimator.

* * * * *